(12) United States Patent
Sakhnini et al.

(10) Patent No.: US 12,464,560 B2
(45) Date of Patent: Nov. 4, 2025

(54) BEAM ALIGNMENT FOR TRANSMISSIONS USING DIFFERENT SUBCARRIER SPACINGS

(71) Applicant: QUALCOMM Incorporated, San Diego, CA (US)

(72) Inventors: Iyab Issam Sakhnini, San Diego, CA (US); Tao Luo, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 396 days.

(21) Appl. No.: 17/648,370

(22) Filed: Jan. 19, 2022

(65) Prior Publication Data
US 2022/0240309 A1    Jul. 28, 2022

Related U.S. Application Data

(60) Provisional application No. 63/199,822, filed on Jan. 27, 2021.

(51) Int. Cl.
*H04W 74/08*    (2024.01)
*H04L 5/00*    (2006.01)

(52) U.S. Cl.
CPC .......... *H04W 74/08* (2013.01); *H04L 5/0053* (2013.01)

(58) Field of Classification Search
CPC .... H04W 72/23; H04W 72/30; H04L 5/0051; H04L 5/0053; H04J 11/00
See application file for complete search history.

(56) References Cited

U.S. PATENT DOCUMENTS

| | | | | |
|---|---|---|---|---|
| 11,540,253 B2* | 12/2022 | Kim | ............... | H04W 52/242 |
| 2019/0037495 A1* | 1/2019 | John Wilson | ..... | H04W 52/0229 |
| 2019/0132170 A1* | 5/2019 | Si | ............... | H04W 56/001 |
| 2019/0260447 A1* | 8/2019 | Nam | ............... | H04W 72/0453 |
| 2020/0084642 A1* | 3/2020 | Siomina | ............... | H04W 56/001 |
| 2020/0266950 A1* | 8/2020 | Hwang | ............... | H04L 5/0048 |
| 2020/0413357 A1* | 12/2020 | Tang | ............... | H04L 5/0032 |
| 2022/0132564 A1* | 4/2022 | Ouchi | ............... | H04W 72/0453 |
| 2022/0191849 A1* | 6/2022 | Yoon | ............... | H04W 72/044 |
| 2022/0322123 A1* | 10/2022 | Kang | ............... | H04B 17/336 |
| 2023/0107283 A1* | 4/2023 | Park | ............... | H04W 48/08 370/329 |
| 2023/0155769 A1* | 5/2023 | Hong | ............... | H04L 5/0048 370/329 |

(Continued)

FOREIGN PATENT DOCUMENTS

EP    4027741 A  *  5/2020

*Primary Examiner* — Mahran Y Abu Roumi
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity, one or more synchronization signal block (SSB) transmissions associated with a first subcarrier spacing (SCS). The UE may receive, from the network entity, one or more initial access transmissions associated with a second SCS, wherein a time location of an initial access transmission, of the one or more initial access transmissions, that uses a beam is based at least in part on a time location of an SSB transmission, of the one or more SSB transmissions, that uses the beam. Numerous other aspects are described.

30 Claims, 14 Drawing Sheets

(56) References Cited

U.S. PATENT DOCUMENTS

2023/0180110 A1\* 6/2023 Kim .................. H04W 48/02
370/329
2023/0247676 A1\* 8/2023 Shin .................. H04L 27/26

\* cited by examiner

BEAM ALIGNMENT FOR TRANSMISSIONS USING DIFFERENT SUBCARRIER SPACINGS

CROSS-REFERENCE TO RELATED APPLICATION

This Patent Application claims priority to U.S. Provisional Patent Application No. 63/199,822, filed on Jan. 27, 2021, entitled "BEAM ALIGNMENT FOR TRANSMISSIONS USING DIFFERENT SUBCARRIER SPACINGS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for beam alignment for transmissions using different subcarrier spacings.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a network entity, one or more synchronization signal block (SSB) transmissions associated with a first subcarrier spacing (SCS); and receiving, from the network entity, one or more initial access transmissions associated with a second SCS, wherein a time location of an initial access transmission, of the one or more initial access transmissions, that uses a beam is based at least in part on a time location of an SSB transmission, of the one or more SSB transmissions, that uses the beam.

In some aspects, a method of wireless communication performed by a network entity includes transmitting, to a UE, one or more SSB transmissions associated with a first SCS; and transmitting, to the UE or another UE, one or more initial access transmissions associated with a second SCS, wherein a time location of an initial access transmission, of the one or more initial access transmissions, that uses a beam is based at least in part on a time location of an SSB transmission, of the one or more SSB transmissions, that uses the beam.

In some aspects, a UE for wireless communication includes a memory and one or more processors operatively coupled to the memory, the memory and the one or more processors configured to: receive, from a network entity, one or more SSB transmissions associated with a first SCS; and receive, from the network entity, one or more initial access transmissions associated with a second SCS, wherein a time location of an initial access transmission, of the one or more initial access transmissions, that uses a beam is based at least in part on a time location of an SSB transmission, of the one or more SSB transmissions, that uses the beam.

In some aspects, a network entity for wireless communication includes a memory and one or more processors operatively coupled to the memory, the memory and the one or more processors configured to: transmit, to a UE, one or more SSB transmissions associated with a first SCS; and transmit, to the UE or another UE, one or more initial access transmissions associated with a second SCS, wherein a time location of an initial access transmission, of the one or more initial access transmissions, that uses a beam is based at least in part on a time location of an SSB transmission, of the one or more SSB transmissions, that uses the beam.

In some aspects, a non-transitory computer-readable medium storing a set of instructions for wireless communication includes one or more instructions that, when executed by one or more processors of a UE, cause the UE to: receive, from a network entity, one or more SSB transmissions associated with a first SCS; and receive, from the network entity, one or more initial access transmissions associated with a second SCS, wherein a time location of an initial access transmission, of the one or more initial access transmissions, that uses a beam is based at least in part on a time location of an SSB transmission, of the one or more SSB transmissions, that uses the beam.

In some aspects, a non-transitory computer-readable medium storing a set of instructions for wireless communication includes one or more instructions that, when executed by one or more processors of a network entity, cause the network entity to: transmit, to a UE, one or more SSB transmissions associated with a first SCS; and transmit, to the UE or another UE, one or more initial access transmissions associated with a second SCS, wherein a time location of an initial access transmission, of the one or more initial access transmissions, that uses a beam is based at least in part on a time location of an SSB transmission, of the one or more SSB transmissions, that uses the beam.

In some aspects, an apparatus for wireless communication includes means for receiving, from a network entity, one or more SSB transmissions associated with a first SCS; and means for receiving, from the network entity, one or more initial access transmissions associated with a second SCS, wherein a time location of an initial access transmission, of the one or more initial access transmissions, that uses a beam is based at least in part on a time location of an SSB transmission, of the one or more SSB transmissions, that uses the beam.

In some aspects, an apparatus for wireless communication includes means for transmitting, to a UE, one or more SSB transmissions associated with a first SCS; and means for transmitting, to the UE or another UE, one or more initial access transmissions associated with a second SCS, wherein a time location of an initial access transmission, of the one or more initial access transmissions, that uses a beam is based at least in part on a time location of an SSB transmission, of the one or more SSB transmissions, that uses the beam.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

Figure 1:
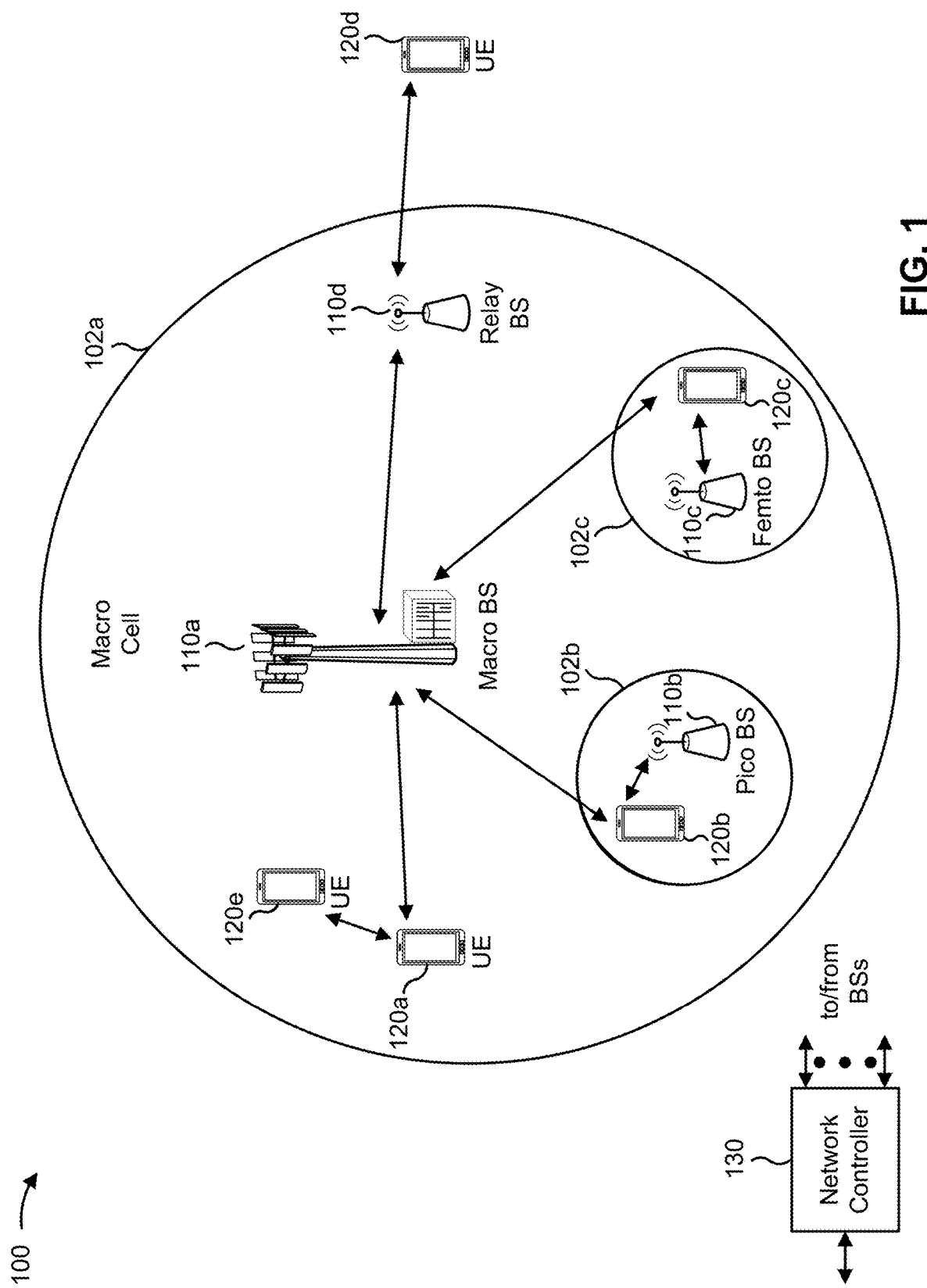
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. A network entity may be a BS or may include one or more components of a BS, such as in a disaggregated radio access network (RAN) configuration or open RAN configuration. For example, a network entity may include an aggregated BS, one or more components of a disaggregated BS, a central unit (CU), a distributed unit (DU), a radio unit (RU), a repeater, a relay, a TRP, or an integrated access and backhaul (IAB) node, among other examples. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
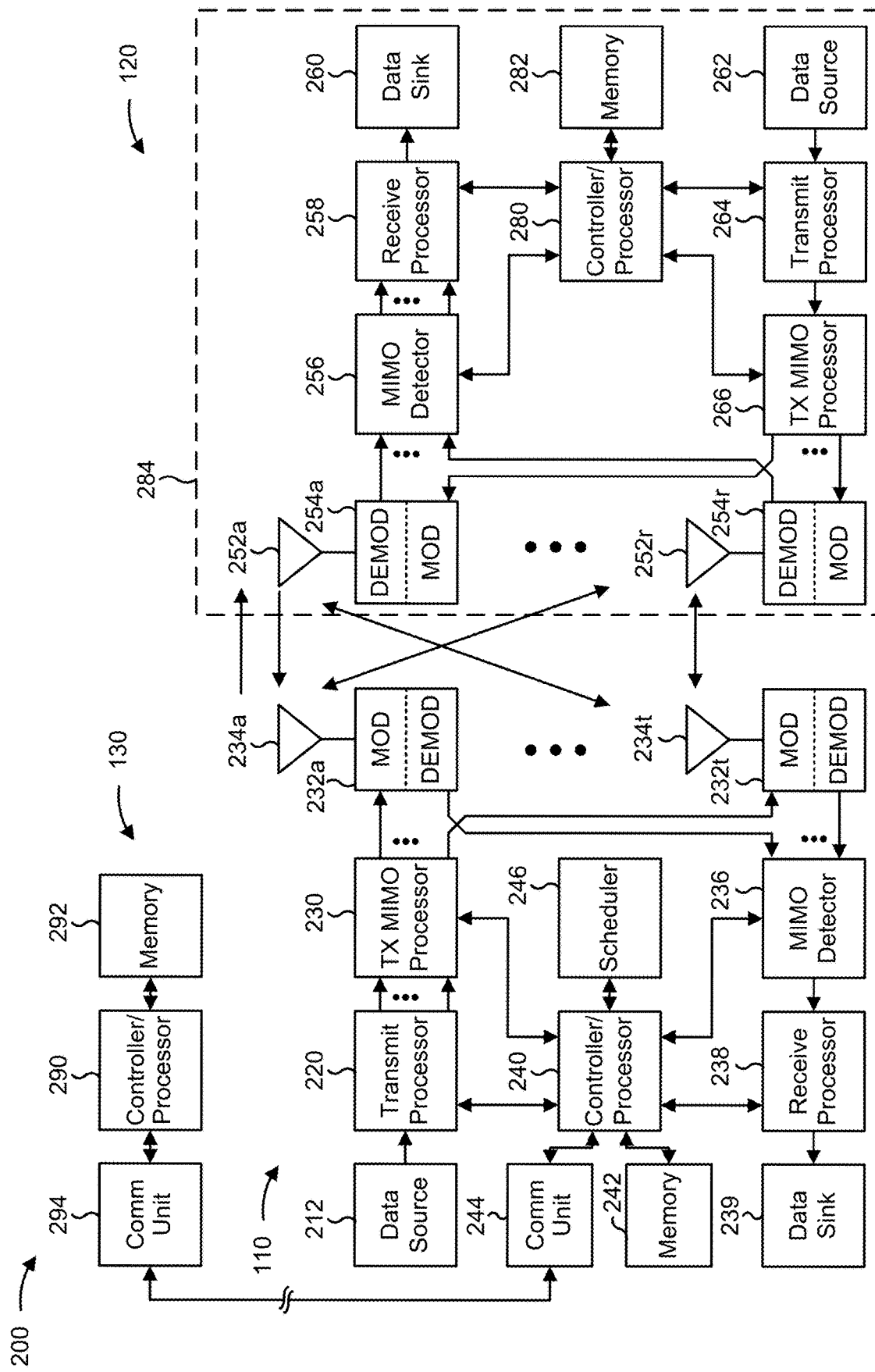
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 8-14).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 8-14).

Controller/processor 240 of base station 110, controller/processor 280 of UE 120, and/or any other component(s) of FIG. 2 may perform one or more techniques associated with beam alignment for transmissions using different subcarrier spacings (SCSs), as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, the UE includes means for receiving, from a base station, one or more synchronization signal block (SSB) transmissions associated with a first SCS; and/or means for receiving, from the base station, one or more initial access transmissions associated with a second SCS. In some aspects, a time location of an initial access transmission, of the one or more initial access transmissions, that uses a beam is based at least in part on a time location of an SSB transmission, of the one or more SSB transmissions, that uses the beam. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for transmitting, to a UE, one or more SSB transmissions associated with a first SCS; and/or means for transmitting, to the UE or another UE, one or more initial access transmissions associated with a second SCS. In some aspects, a time location of an initial access transmission, of the one or more initial access transmissions, that uses a beam is based at least in part on a time location of an SSB transmission, of the one or more SSB transmissions, that uses the beam. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
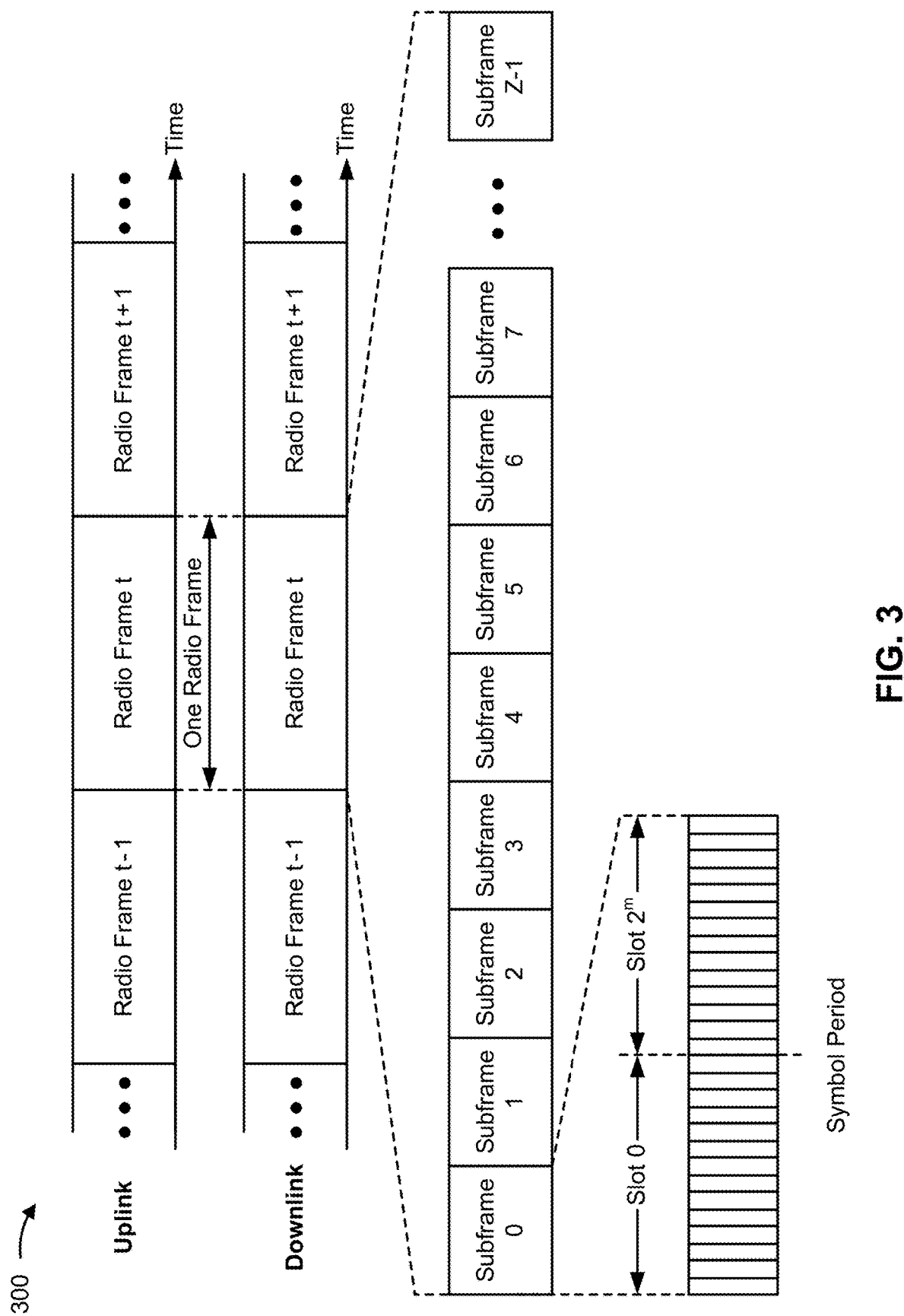
FIG. 3 is a diagram illustrating an example of a frame structure in a wireless communication network, in accordance with the present disclosure.

FIG. 3 is a diagram illustrating an example 300 of a frame structure in a wireless communication network, in accordance with the present disclosure. The frame structure shown in FIG. 3 is for frequency division duplexing (FDD) in a telecommunication system, such as LTE or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2m slots per subframe are shown in FIG. 3, where m is an index of a numerology used for a transmission, such as 0, 1, 2, 3, 4, or another number). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, or symbol-based.

As indicated above, FIG. 3 is provided as an example. Other examples may differ from what is described with respect to FIG. 3.

Figure 4:
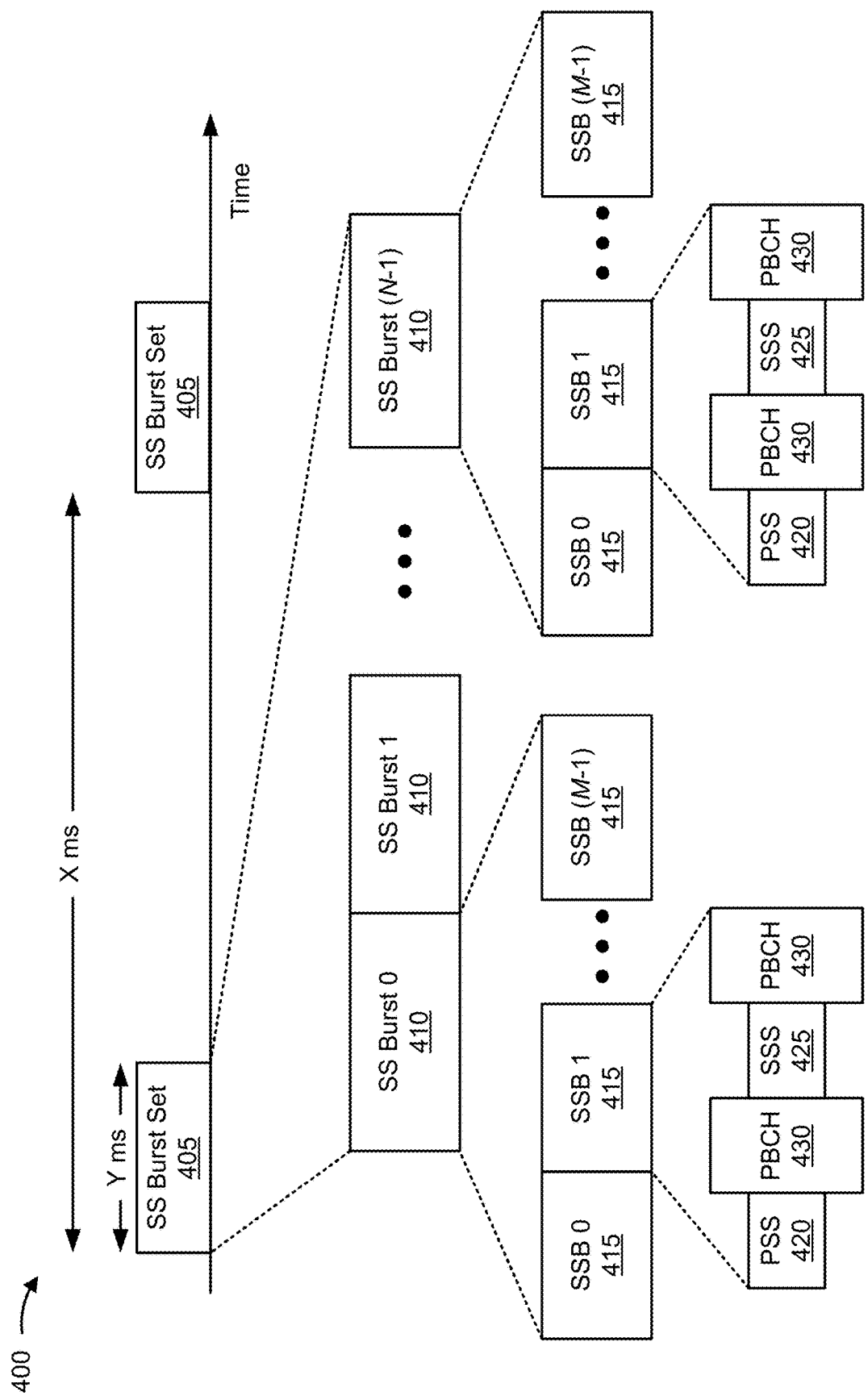
FIG. 4 is a diagram illustrating an example of a synchronization signal hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by the base station. As further shown, each SS burst 410 may include one or more SS blocks (SSBs) 415, shown as SSB 0 through SSB M−1, where M is a maximum number of SSBs 415 that can be carried by an SS burst 410. In some aspects, different SSBs 415 may be beam-formed differently (e.g., transmitted using different beams), and may be used for cell search, cell acquisition, beam management, and/or beam selection (e.g., as part of an initial network access procedure). An SS burst set 405 may be periodically transmitted by a wireless node (e.g., base station 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window.

In some aspects, an SSB 415 may include resources that carry a primary synchronization signal (PSS) 420, a secondary synchronization signal (SSS) 425, and/or a physical broadcast channel (PBCH) 430. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., base station 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415.

A UE 120 may monitor for and/or measure SSBs 415 using different receive (Rx) beams during an initial network access procedure and/or a cell search procedure, among other examples. Based at least in part on the monitoring and/or measuring, the UE 120 may indicate one or more SSBs 415 with a best signal parameter (e.g., a reference signal received power (RSRP) parameter) to a base station 110. The base station 110 and the UE 120 may use the one or more indicated SSBs 415 to select one or more beams to be used for communication between the base station 110 and the UE 120 (e.g., for a random access channel (RACH) procedure). Additionally, or alternatively, the UE 120 may use the SSB 415 and/or the SSB index to determine a cell timing for a cell via which the SSB 415 is received (e.g., a serving cell).

As indicated above, FIG. 4 is provided as an example. Other examples may differ from what is described with regard to FIG. 4.

Figure 5:
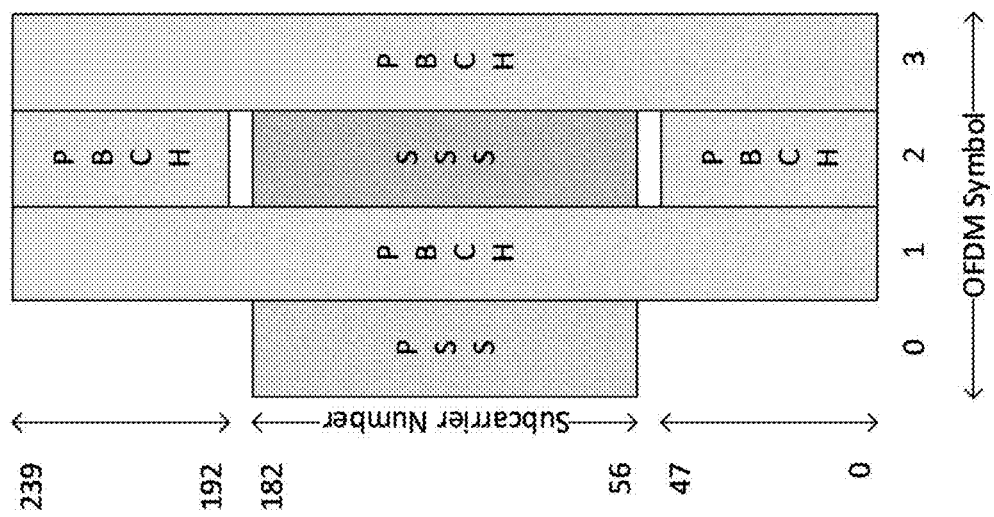
FIG. 5 is a diagram illustrating an example of a synchronization signal block (SSB), in accordance with the present disclosure.

FIG. 5 is a diagram illustrating an example of an SSB 500, in accordance with the present disclosure. In some examples, the SCS for the SSB may be 15 kHz or 30 kHz in FR1 and 120 kHz or 240 kHz in FR2.

As described above in connection with FIG. 4, and as shown in FIG. 5, the SSB 500 may span four OFDM symbols. One symbol may be used for a PSS (symbol 0, as shown), two symbols may be used for a PBCH (symbols 1 and 3, as shown), and one symbol may be used for an SSS and a PBCH that are frequency division multiplexed (symbol 2, as shown). The PSS may use a frequency domain-based M-sequence with a length of 127 (e.g., the sequence is mapped to 127 subcarriers). The PSS may be one of three possible sequences. The SSS may use a frequency domain-based Gold Code sequence (e.g., two M-sequences) with a length of 127 (e.g., the sequence is mapped to 127 subcarriers). The SSS may be one of 1008 possible sequences. The PBCH may use a quadrature phase shift keying (QPSK) modulation, and the PBCH may be coherently demodulated using an associated DMRS.

As indicated above, FIG. 5 is provided as an example. Other examples may differ from what is described with regard to FIG. 5.

Figure 6:
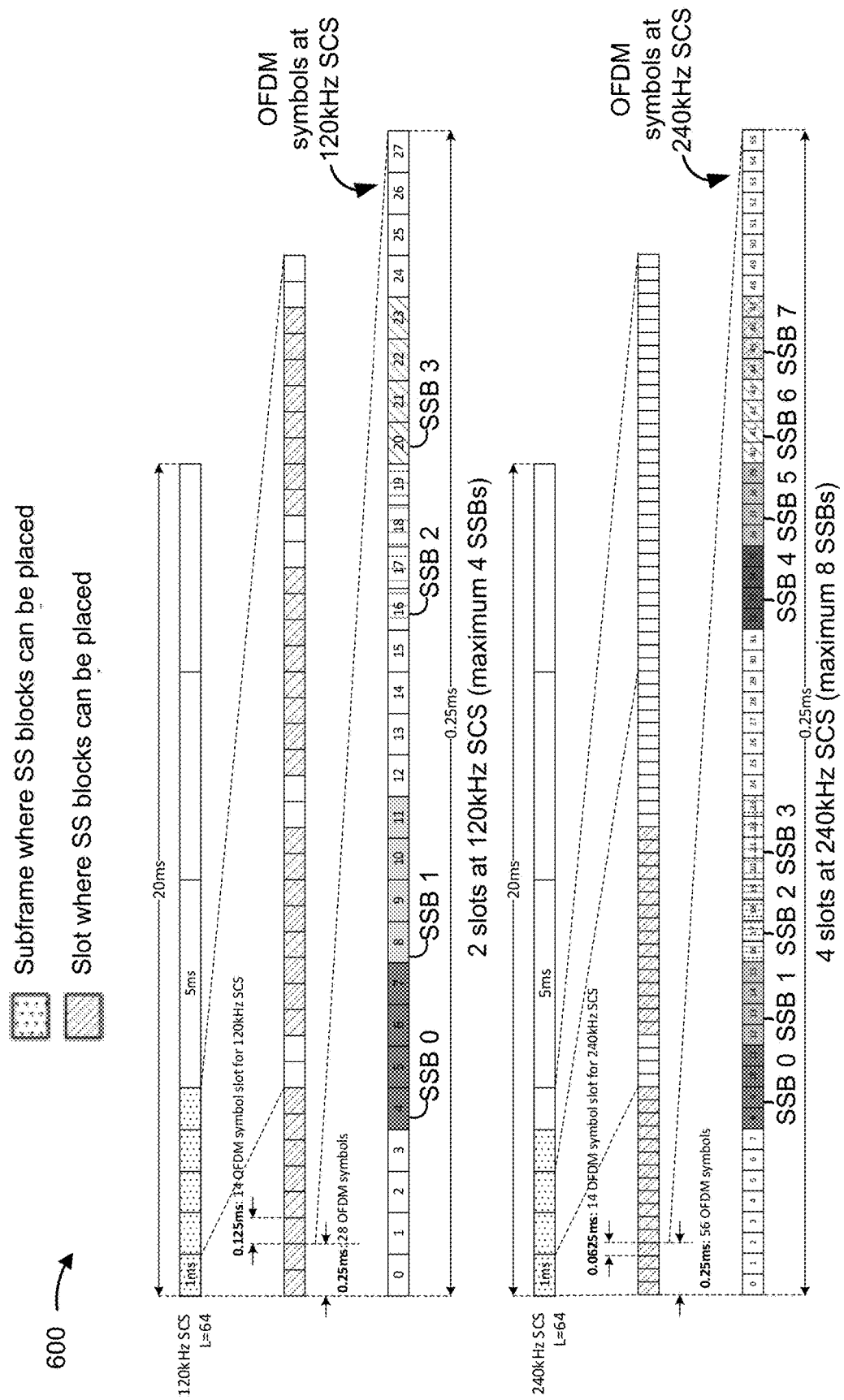
FIG. 6 is a diagram illustrating an example of SSB locations, in accordance with the present disclosure.

FIG. 6 is a diagram illustrating an example 600 of SSB locations, in accordance with the present disclosure. A time location (e.g., slots and/or OFDM symbols) of an SSB may be according to a specified (e.g., fixed) pattern. As shown in example 600, the time locations of SSBs may be based at least in part on an SCS, which may be 15 kHz or 30 kHz in FR1, 120 kHz or 240 kHz in FR2, or the like. For example, for a 120 kHz SCS, there may be 64 SSBs in a 5 ms half frame, and FIG. 6 shows an example pattern for four SSBs (SSBs 0-3, where 0-3 refer to SSB indices) in two slots at the 120 kHz SCS. As another example, for a 240 kHz SCS, there may be 64 SSBs in a 5 ms half frame, and FIG. 6 shows an example pattern for eight SSBs (SSBs 0-7, where 0-7 refer to SSB indices) in four slots at the 240 kHz SCS.

The time locations for SSBs, according to the patterns described above, are possible locations for SSBs. Accordingly, any set of the time locations may be used for actual SSB transmissions. In this case, a UE may receive an indication of the time locations where SSBs are to be transmitted. For example, the indication may identify the SSB positions (e.g., SSB indices) where SSBs are to be transmitted, and the SSB positions may correspond to the time locations of a pattern, as described above.

In FR2, for example, an SSB may be multiplexed with a control resource set (CORESET) with an index 0 (CORESET 0). CORESET 0 may be used for transmitting a physical downlink control channel (PDCCH) for system information block (SIB) 1 scheduling. CORESET 0 may have a length of one, two, or three symbols, and may include 24, 48, or 96 resource blocks. A SIB 1 may include system information that is used by a UE for cell access. The SIB 1 may also include information related to the availability and scheduling of other SIBs.

In some examples, an SSB may be multiplexed with a CORESET 0 using one of three possible multiplexing patterns. In a first multiplexing pattern, the SSB and the CORESET 0 may be time division multiplexed. In a second multiplexing pattern, the SSB and the CORESET 0 use different SCSs and may be frequency division multiplexed and time division multiplexed. In a third multiplexing pattern, the SSB and the CORESET 0 use the same SCS and may be frequency division multiplexed.

A UE may receive a master information block (MIB) that may include a configuration (e.g., pdcch-ConfigSIB1) relating to CORESET 0. The configuration may indicate (e.g., in a controlResourceSetZero parameter, which may use four bits) a multiplexing pattern for an SSB and CORESET 0, as well as a frequency offset, a quantity of resource blocks, and a quantity of symbols for CORESET 0. The configuration also may indicate (e.g., in a searchSpaceZero parameter, which may use four bits) a time location for CORESET 0, which may be only one value (e.g., a 0 value) for the second and third multiplexing patterns.

As indicated above, FIG. 6 is provided as an example. Other examples may differ from what is described with regard to FIG. 6.

Figure 7:
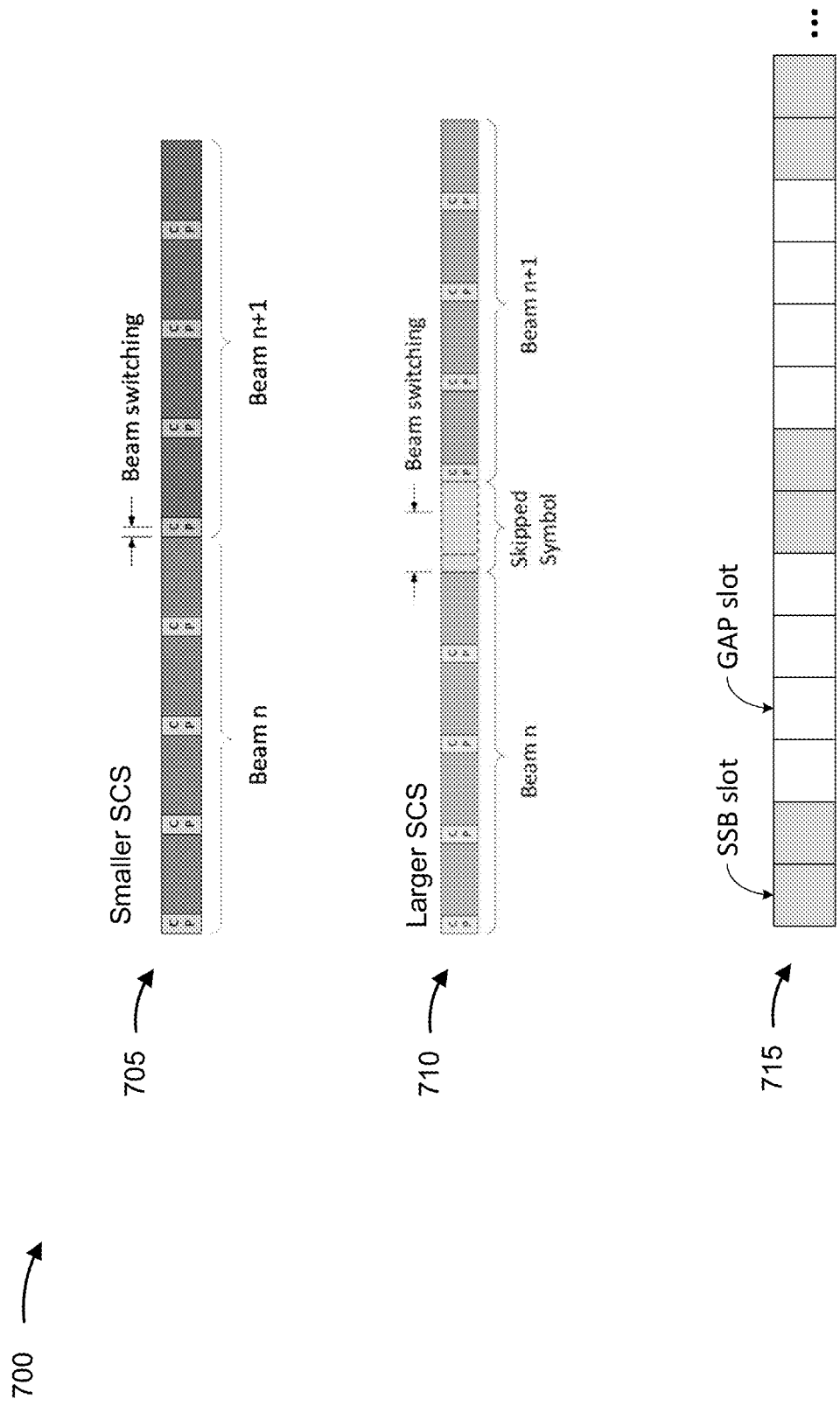
FIG. 7 is a diagram illustrating an example of time gaps for SSBs, in accordance with the present disclosure.

FIG. 7 is a diagram illustrating an example 700 of time gaps for SSBs, in accordance with the present disclosure. As shown in Table 1 below, a time duration for a symbol and a cyclic prefix (CP) may decrease proportionally with an SCS increase:

TABLE 1

| μ | 0 | 1 | 2 | 3 | 4 | 5 | 6 |
|---|---|---|---|---|---|---|---|
| SCS (kHz) | 15 | 30 | 60 | 120 | 240 | 480 | 960 |
| Tcp (ns) | 4687.5 | 2343.8 | 1171.9 | 585.9 | 293.0 | 146.5 | 73.2 |
| Tsymb (ns) | 66666.7 | 33333.3 | 16666.7 | 8333.3 | 4166.7 | 2083.3 | 1041.7 | where μ represents a numerology, Tcp is the time for a CP in nanoseconds (ns), and Tsymb is the time for a symbol in ns.

In some examples, a beam switching time gap may be needed between consecutive SSB beams to facilitate a beam switching delay at a base station. The beam switching delay may be about 100 ns. As shown by reference number 705, at lower SCSs (e.g., used currently in NR), the CP length is long enough (e.g., greater than 100 ns) to include a time gap for SSB beam switching. However, at higher SCSs (e.g., greater than 480 kHz), it may not be feasible to include a time gap in a CP that is relatively shorter in duration. As shown by reference number 710, at higher SCSs (e.g., in higher-frequency bands), a symbol-level time gap may be used to enable SSB beam switching. For example, according to a symbol-level time gap, a symbol may be skipped between consecutive SSB beams to enable SSB beam switching.

In addition, switching between downlink communication and uplink communication (DL/UL switching) may be affected at a higher SCS. For example, at a higher SCS, and thus a shorter symbol duration, DL/UL switching delay may have a duration of multiple symbols (e.g., the switching delay may have a duration of a slot). Accordingly, to account for uplink segments within an SSB burst, multiple symbols may be reserved for DL/UL switching delay. As shown by reference number 715, at a higher SCS, an SSB pattern may include one or more gap slots within SSB slots of an SSB burst. The gap slot(s) may be used for uplink traffic and/or ultra-reliable low-latency communication (URLLC) traffic.

As indicated above, FIG. 7 is provided as an example. Other examples may differ from what is described with regard to FIG. 7.

In some examples, NR may operate in a frequency range between 52.6 GHz and 71 GHz. In these cases, various physical layer parameters related to initial access may be used. For example, operation in this frequency range for data channels, control channels, and/or reference signals (e.g., supporting only a normal CP) may use a 480 kHz SCS and/or a 960 kHz SCS (e.g., in addition to a 120 kHz SCS), and a maximum bandwidth may be defined. Operation with a 480 kHz SCS and a 960 kHz SCS may use a common design framework (except with respect to timelines).

For example, licensed and unlicensed operation in this frequency range may use up to 64 SSB beams. Moreover, a 120 kHz SCS may be used for SSBs and signals and/or channels related to initial access in an initial bandwidth part. In some examples, additional SCSs, such as a 240 kHz SCS, a 480 kHz SCS, and/or a 960 kHz SCS, may be used for SSBs, and additional SCSs, such as a 480 kHz SCS and/or a 960 kHz SCS, may be used for signals and/or channels related to initial access in an initial bandwidth part. In some examples, additional SCSs, such as a 480 kHz SCS and/or a 960 kHz SCS, may be used for SSBs that are not used for initial access.

In some cases, a system operating between 52.6 GHz and 71 GHz (e.g., that uses an SSB SCS of 120 kHz, 240 kHz, 480 kHz, and/or 960 kHz, as described above) may be deployed with carrier aggregation. Here, a first component carrier may use a relatively low SCS (e.g., 120 kHz) and a second component carrier may use a relatively higher SCS (e.g., 480 kHz or 960 kHz). For example, a primary component carrier (or primary cell (PCell)) may use a 120 kHz SCS for better coverage, and the primary component carrier may be aggregated with a secondary component carrier (or secondary cell (SCell)) that uses a 960 kHz SCS, for example, for a higher data rate. In some examples, beam directions for SSBs on both cells may not be time aligned. Thus, there may be considerable beam direction blockage overhead in connection with separately reserving a beam direction for PCell SSBs and SCell SSBs at different times.

Some techniques and apparatuses described herein provide for time alignment of beam directions used for SSB transmissions and initial access transmissions (e.g., SSB transmissions, transmissions in CORESET 0, and/or SIB 1 transmissions) associated with different SCSs. For example, an SSB beam on a first component carrier, associated with a first SCS, may be time aligned with an SSB beam on a second component carrier associated with a second SCS. In some aspects, downlink initial access channels and/or signals may use a beam pattern for a relatively higher SCS. According to the beam pattern, a time location for a downlink initial access channel and/or signal, for a particular beam, is confined within (or within a threshold quantity of symbols before or after) an SSB time location, for a corresponding beam (e.g., that uses the same direction as the particular beam), according to a beam pattern for a relatively lower SCS. In some aspects, SSBs associated with the relatively higher SCS may be time division multiplexed with SSBs associated with the relatively lower SCS (e.g., in a manner that reduces beam switching). This may be useful in unlicensed band associated with a limited transmit power (e.g., a limited effective isotropic radiated power (EIRP)), because frequency division multiplexing of SSBs on different component carriers may reduce the transmit power that can be used for the SSBs.

It may be beneficial to align beam directions for component cells (e.g., a PCell and an SCell) that use different SCSs. For example, if the same antenna is used for both cells, a single beam forming may be used for both cells at a given time. Moreover, a UE may use the same quasi-co-location (QCL) assumptions on both cells, thereby facilitating efficient scheduling of the UE. In addition, a UE may perform SSB measurements on both cells with greater efficiency and speed. In this way, network resources, as well as computing and battery resources of the UE, may be conserved.

Figure 8:
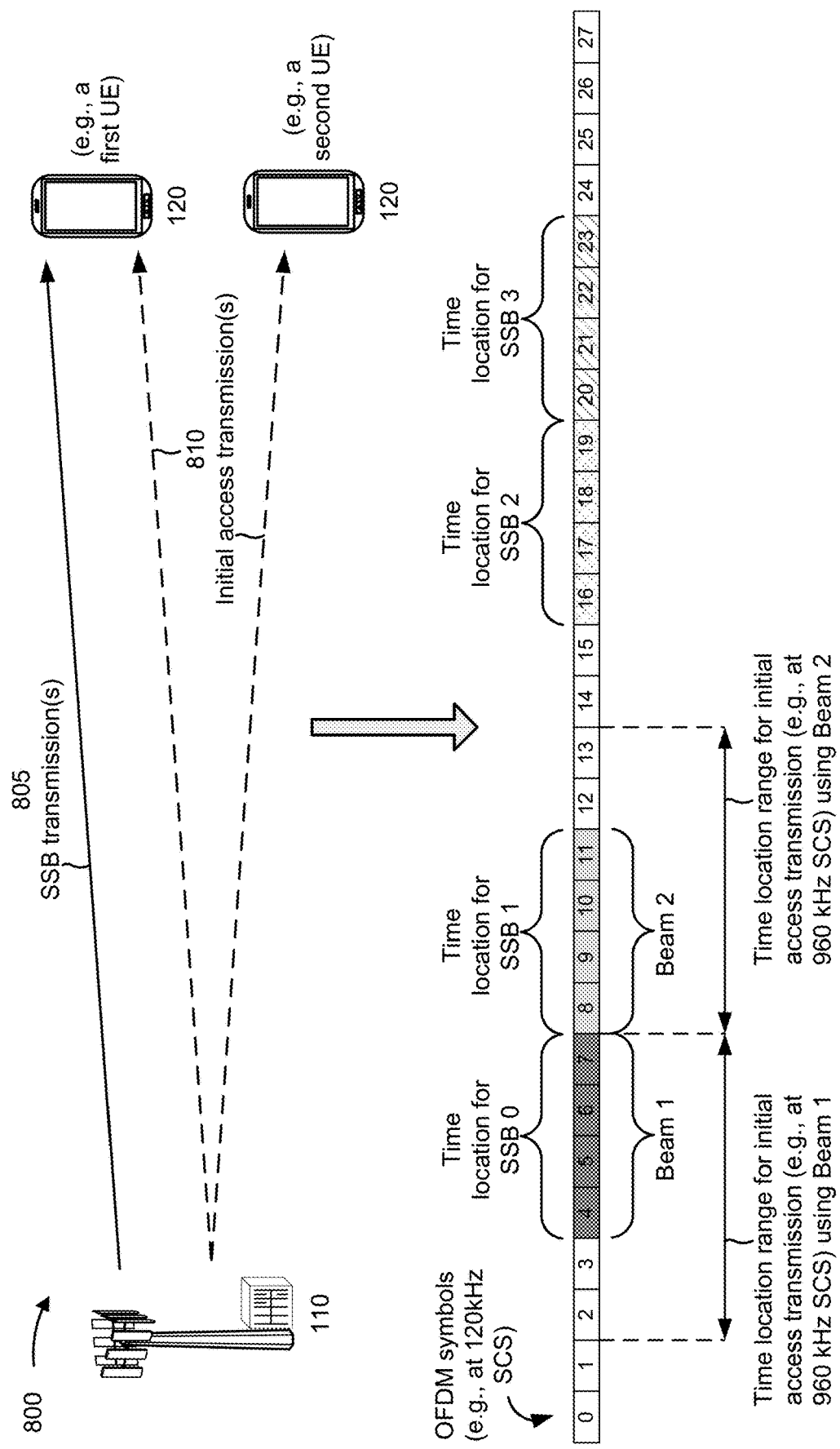
FIGS. 8-10 are diagrams illustrating examples associated with beam alignment for transmissions using different sub-carrier spacings (SCSs), in accordance with the present disclosure.

FIG. 8 is a diagram illustrating an example 800 of beam alignment for transmissions using different SCSs, in accordance with the present disclosure. As shown in FIG. 8, a base station 110 may communicate with one or more UEs 120 (e.g., a first UE 120 and a second UE 120). In some aspects, a UE 120 may be provisioned with information that identifies one or more SSB beam patterns (e.g., time locations for SSB transmissions using different beams). For example, the information may identify respective SSB beam patterns for different SCSs (e.g., a 120 kHz SCS, a 240 kHz SCS, a 480 kHz SCS, and/or a 960 kHz SCS). As an example, according to an SSB beam pattern for a 120 kHz SCS, as shown in FIG. 8, an SSB using a first beam may be located in symbols 4-7, an SSB using a second beam may be located in symbols 8-11, an SSB using a third beam may be located in symbols 16-19, and an SSB using a fourth beam may be located in symbols 20-23.

As shown by reference number 805, the base station 110 may transmit, and a UE 120 (e.g., the first UE 120) may receive, one or more SSB transmissions. The SSB transmission(s) may be associated with a first SCS. For example, the base station 110 may transmit the SSB transmission(s) on a first component carrier (e.g., a first cell, such as a PCell) that uses the first SCS. The first SCS may be a relatively smaller SCS (e.g., 120 kHz). The base station 110 may transmit the SSB transmission(s) in accordance with an SSB beam pattern (e.g., associated with the first SCS). For example, an SSB transmission that uses a particular beam may be in a particular time location (e.g., according to the SSB beam pattern). "Time location" may refer to a time period (e.g., a time duration), such as one or more symbols.

As shown by reference number 810, the base station 110 may transmit, and the UE 120 (e.g., the first UE 120) or another UE 120 (e.g., the second UE 120) may receive, one or more initial access transmissions. That is, the same UE 120 may receive an SSB transmission (shown by reference number 805) and an initial access transmission (shown by reference number 810), or different UEs 120 may receive an SSB transmission and an initial access transmission, respectively.

An initial access transmission may be associated with one or more downlink initial access channels and/or signals. An initial access transmission may include one or more of an SSB transmission, a transmission (e.g., a PDCCH transmission) in a CORESET, or a SIB transmission (e.g., a SIB physical downlink shared channel (PDSCH) transmission). In some aspects, the transmission in the CORESET may include a transmission in a CORESET 0. In some aspects, the SIB transmission may include a SIB1 transmission (e.g., a SIB1 PDSCH transmission). For example, an initial access transmission may include only an SSB transmission, may include only an SSB transmission and a CORESET 0 transmission, or may include an SSB transmission, a CORESET 0 transmission, and a SIB1 PDSCH transmission.

The initial access transmission(s) may be associated with a second SCS. For example, the base station 110 may transmit the initial access transmission(s) on a second component carrier (e.g., a second cell, such as a SCell) that uses the second SCS. The second SCS may be a relatively larger SCS (e.g., 480 kHz or 960 kHz). That is, the second SCS may be larger than the first SCS. The base station 110 may transmit SSB transmission(s), of the initial access transmission(s), in accordance with an SSB beam pattern (e.g., associated with the second SCS), in a similar manner as described above.

In some aspects, a time location of an initial access transmission, associated with the second SCS, that uses a particular beam may be based at least in part on a time location of an SSB transmission, associated with the first SCS, that uses the particular beam (e.g., the initial access transmission and the SSB transmission may use corresponding beams, such as beams that use the same direction). For example, the time location of the initial access transmission may be confined within (e.g., exactly within) the time location of the SSB transmission. Here, the base station 110 may transmit the SSB transmission and the initial access transmission simultaneously (e.g., in the same symbols). As another example, the time location of the initial access transmission may be within a threshold time (e.g., a threshold quantity of symbols, such as one symbol, two symbols, or three symbols) before or after the time location of the SSB transmission. Here, the base station 110 may transmit the initial access transmission and the SSB transmission in a time division multiplexed manner (e.g., for communication in an unlicensed band).

In this way, a beam pattern, associated with the second SCS, for initial access transmissions may be specified such that a time location for a beam is within a threshold distance (e.g., confined within, or within a threshold time before or after) of a time location for the same beam according to a beam pattern, associated with the first SCS, for SSB transmissions. Accordingly, an SSB, a CORESET 0, or a SIB1 PDSCH, associated with the second SCS, may have beam alignment with an SSB associated with the first SCS. In some aspects, the first UE 120, the second UE 120, and/or the base station 110 may perform SSB measurement, perform an initial access procedure (e.g., transmit and/or receive random access messages), and/or perform a beam management procedure (e.g., transmit and/or receive a channel station information (CSI) report), among other examples, based at least in part on the beam alignment.

In some aspects, the base station 110 may transmit, and a UE 120 (e.g., the first UE 120 or the second UE 120) may receive, the one or more initial access transmissions according to a time gap. For example, a time gap may be between consecutive initial access transmissions (e.g., initial access transmissions that use consecutive beams according to a beam pattern). In some aspects, the time gap may be a symbol-level gap (e.g., one or more symbols), as described above. Here, the time gap may accommodate beam switching delay at the base station 110. In some aspects, the time gap may be a slot-level gap (e.g., one or more slots), as described above. Here, the time gap may accommodate UL/DL switching delays, uplink traffic, and/or URLLC traffic.

In some aspects, the signals and/or channels for an initial access transmission (e.g., an SSB, a CORESET 0, and/or a SIB1 PDSCH) may be multiplexed. For example, the signals and/or channels may be time division multiplexed, frequency division multiplexed, or a combination of time division multiplexed and frequency division multiplexed. As an example, two or more of an SSB, a CORESET (e.g., CORESET 0), or a SIB (e.g., SIB1) PDSCH, for an initial access transmission, may be time division multiplexed and/or frequency division multiplexed together. In one example, the CORESET and the SIB may be time division multiplexed, and the SSB may be frequency division multiplexed with the CORESET and the SIB PDSCH. In another example, the SSB and the CORESET may be time division multiplexed, and the SSB and the CORESET may be frequency division multiplexed with the SIB PDSCH.

In some aspects, the signals and/or channels may be contiguous in time (e.g., back-to-back, without time gaps). For example, two or more of an SSB, a CORESET (e.g., CORESET 0), or a SIB (e.g., SIB1) PDSCH, for an initial access transmission, may be contiguous in time. As an example, the SSB, the CORESET, and the SIB PDSCH all may be contiguous in time. In some aspects, the signals and/or channels may be non-contiguous in time. For example, two or more of an SSB, a CORESET (e.g., CORESET 0), or a SIB (e.g., SIB1) PDSCH, for an initial access transmission, may be non-contiguous in time (e.g., as shown for beam 3 of example 915 in FIG. 9). As an example, the SSB and the CORESET may be non-contiguous in time (and the CORESET and the SIB PDSCH may be contiguous, or non-contiguous, in time).

In some aspects, the signals and/or channels for different initial access transmissions (e.g., that use different beams) may have different starting times relative to time locations of corresponding SSB transmissions (e.g., associated with the first SCS). For example, a starting time of a first initial access transmission (e.g., associated with the second SCS) that uses a first beam relative to a time location of a first SSB transmission (e.g., associated with the first SCS) that uses the same first beam, may be different from a starting time of a second initial access transmission (e.g., associated with the second SCS) that uses a second beam relative to a time location of a second SSB transmission (e.g., associated with the first SCS) that uses the same second beam (e.g., as shown by examples 900 and 940 of FIG. 9, and examples 1000, 1015, and 1035 of FIG. 10). In other words, relative to a time location of an SSB transmission associated with the first SCS, a corresponding (e.g., using the same beam) initial access transmission, associated with the second SCS, may start at a beginning of the time location, at a middle of the time location, or at an end of the time location. Moreover, different initial access transmissions may use different relative starting times, as described above.

In some aspects, a CORESET (e.g., CORESET 0) and/or a SIB (e.g., SIB1) PDSCH, for an initial access transmission (e.g., using a particular beam), may span multiple (e.g., more than one) slots (e.g., of the second SCS). That is, the CORESET may span multiple slots and/or the SIB PDSCH may span multiple slots (e.g., as shown by examples 905, 910, and 925 of FIG. 9, and examples 1005 and 1020 of FIG. 10). In some aspects, a CORESET (e.g., CORESET 0) and/or a SIB (e.g., SIB1) PDSCH, for an initial access transmission (e.g., using a particular beam), may be confined to a single slot (e.g., of the second SCS). That is, the CORESET may be confined to a single slot and/or the SIB PDSCH may be confined to a single slot (e.g., as shown by example 920 of FIG. 9 and example 1010 of FIG. 10). For example, the CORESET and the SIB PDSCH may be confined to the same single slot.

In some aspects, an SSB transmission, a CORESET (e.g., CORESET 0), and a SIB (e.g., SIB1) PDSCH, for an initial access transmission (e.g., using a particular beam), may be confined to a single slot (e.g., of the second SCS). For example, the SSB transmission, the CORESET, and the SIB PDSCH may be confined to the same single slot (e.g., as shown by examples 920, 930, and 935 of FIG. 9, and examples 1015, 1025, and 1030 of FIG. 10).

As indicated above, FIG. 8 is provided as an example. Other examples may differ from what is described with respect to FIG. 8.

Figure 9:
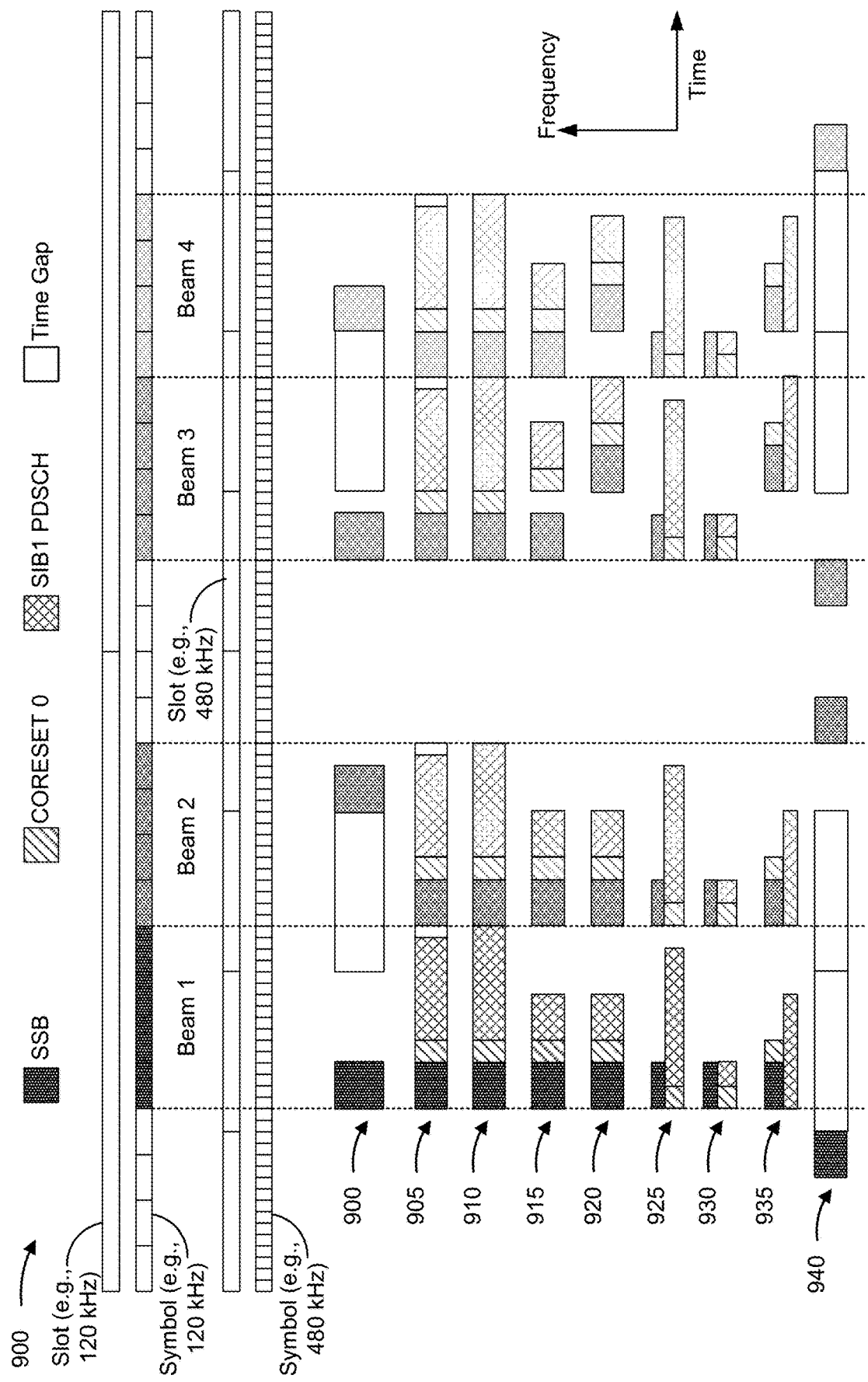

FIG. 9 is a diagram illustrating examples 900, 905, 910, 915, 920, 925, 930, 935, and 940 of beam alignment for transmissions using different SCSs, in accordance with the present disclosure. These examples show various time locations for initial access channels and/or signals (e.g., an SSB, a CORESET 0, and/or a SIB1 PDSCH) at the second SCS (e.g., a 480 kHz SCS). Example time locations for SSBs at the first SCS (e.g., a 120 kHz SCS) are shown in the upper symbol timeline.

In example 900, a gap slot (e.g., of the second SCS) may be included between SSBs of consecutive initial access transmissions. In example 905, an SSB, a CORESET 0, and a SIB1 PDSCH for an initial access transmission may be time domain multiplexed. In addition, a symbol-level (e.g., of the second SCS) time gap may be between consecutive initial access transmissions. In example 910, an SSB, a CORESET 0, and a SIB1 PDSCH for an initial access transmission may be time domain multiplexed, and there may be no time gap between consecutive initial access transmissions. In example 915, an SSB, a CORESET 0, and a SIB1 PDSCH for an initial access transmission may be time domain multiplexed. In addition, a CORESET 0 and a SIB1 PDSCH for an initial access transmission may be confined to a single slot (e.g., of the second SCS). In example 920, an SSB, a CORESET 0, and a SIB1 PDSCH for an initial access transmission may be time domain multiplexed. In addition, an SSB, a CORESET 0, and a SIB1 PDSCH for an initial access transmission may be confined to a single slot (e.g., of the second SCS).

In example 925, an SSB for an initial access transmission may be frequency domain multiplexed with a CORESET 0 and a SIB 1 PDSCH for the initial access transmission. In example 930, an SSB for an initial access transmission may be frequency domain multiplexed with a CORESET 0 and a SIB 1 PDSCH for the initial access transmission. In addition, an SSB, a CORESET 0, and a SIB1 PDSCH for an initial access transmission may be confined to a single slot (e.g., of the second SCS). In example 935, an SSB and a CORESET 0 for an initial access transmission may be frequency domain multiplexed with a SIB 1 PDSCH for the initial access transmission. In addition, an SSB, a CORESET 0, and a SIB1 PDSCH for an initial access transmission may be confined to a single slot (e.g., of the second SCS).

In examples 900, 905, 910, 915, 920, 925, 930, and 935, a time location for an initial access transmission (e.g., at the second SCS) using a particular beam (e.g., Beam 1) may be within a time location for an SSB transmission (e.g., at the first SCS) using the particular beam, as described above. In example 940, multiple gap slots (e.g., of the second SCS) may be included between SSBs of consecutive initial access transmissions. In addition, a time location for an initial access transmission (e.g., at the second SCS) using a particular beam (e.g., Beam 1) may be outside of, but within a threshold time of, a time location for an SSB transmission (e.g., at the first SCS) using the particular beam, as described above.

As indicated above, FIG. 9 is provided as an example. Other examples may differ from what is described with respect to FIG. 9.

Figure 10:
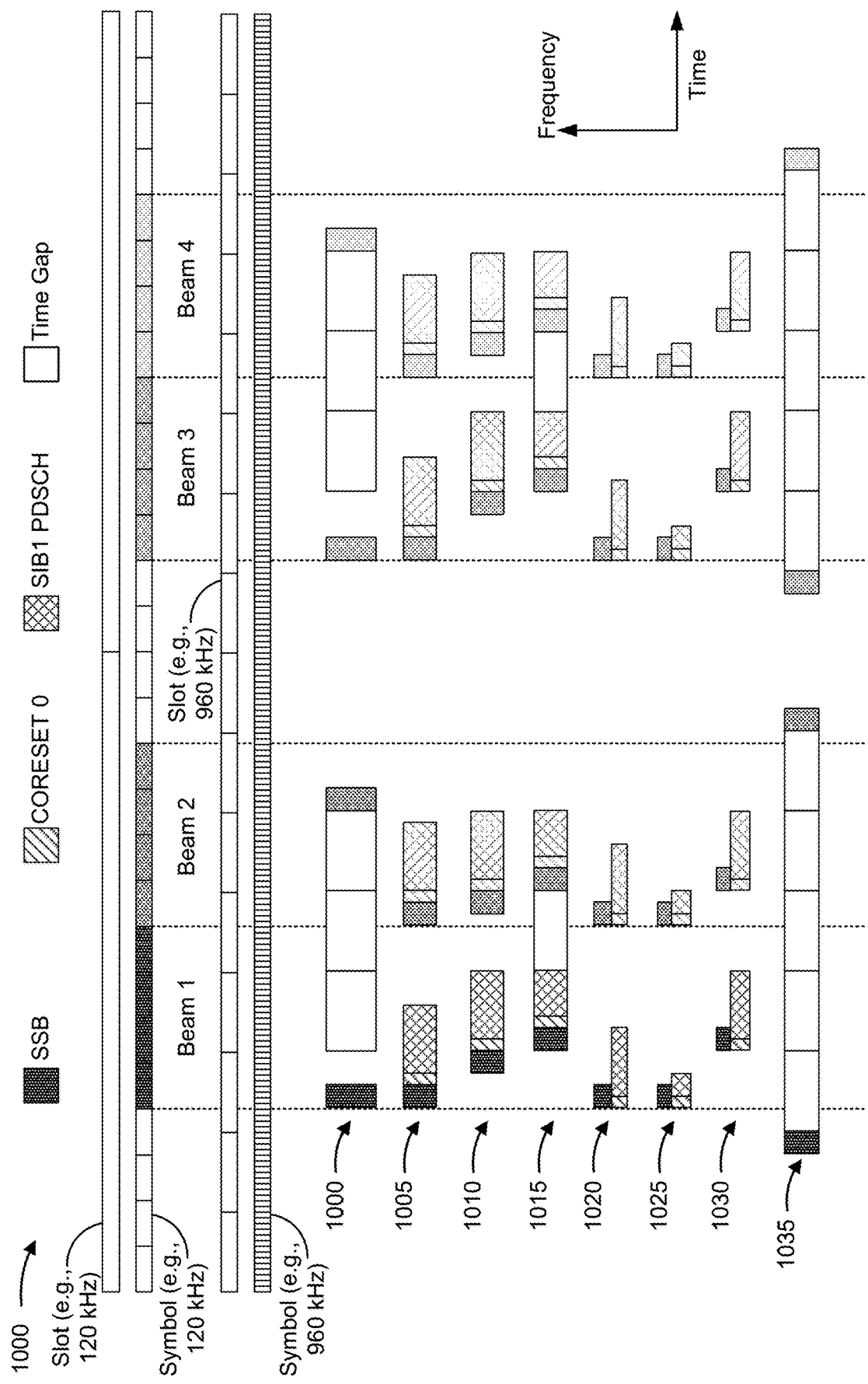

FIG. 10 is a diagram illustrating examples 1000, 1005, 1010, 1015, 1020, 1025, 1030, and 1035 of beam alignment for transmissions using different SCSs, in accordance with the present disclosure. These examples show various time locations for initial access channels and/or signals (e.g., an SSB, a CORESET 0, and/or a SIB1 PDSCH) at the second SCS (e.g., a 960 kHz SCS). Example time locations for SSBs at the first SCS (e.g., a 120 kHz SCS) are shown in the upper symbol timeline.

In example 1000, multiple gap slots (e.g., of the second SCS) may be included between SSBs of consecutive initial access transmissions. In example 1005, an SSB, a CORESET 0, and a SIB1 PDSCH for an initial access transmission may be time domain multiplexed. In example 1010, an SSB, a CORESET 0, and a SIB1 PDSCH for an initial access transmission may be time domain multiplexed. In addition, a CORESET 0 and a SIB1 PDSCH for an initial access transmission may be confined to a single slot (e.g., of the second SCS). For example, a timing value (k0), indicating a quantity of slots between a PDCCH in the CORESET 0 and the SIB1 PDSCH, may be zero (e.g., k0=0). In example 1015, an SSB, a CORESET 0, and a SIB1 PDSCH for an initial access transmission may be time domain multiplexed. In addition, an SSB, a CORESET 0, and a SIB1 PDSCH for an initial access transmission may be confined to a single slot (e.g., of the second SCS).

In example 1020, an SSB for an initial access transmission may be frequency domain multiplexed with a CORESET 0 and a SIB 1 PDSCH for the initial access transmission. In examples 1025 and 1030, an SSB for an initial access transmission may be frequency domain multiplexed with a CORESET 0 and a SIB 1 PDSCH for the initial access transmission. In addition, an SSB, a CORESET 0, and a SIB1 PDSCH for an initial access transmission may be confined to a single slot (e.g., of the second SCS). In example 1030, a start time of an initial access transmission (e.g., at the second SCS) using a particular beam (e.g., Beam 1) may not be aligned with a start time for an SSB transmission (e.g., at the first SCS) using the particular beam.

In examples 1000, 1005, 1010, 1015, 1020, 1025, and 1030, a time location for an initial access transmission (e.g., at the second SCS) using a particular beam (e.g., Beam 1) may be within a time location for an SSB transmission (e.g., at the first SCS) using the particular beam, as described above. In example 1035, multiple gap slots (e.g., of the second SCS) may be included between SSBs of consecutive initial access transmissions. In addition, a time location for an initial access transmission (e.g., at the second SCS) using a particular beam (e.g., Beam 1) may be outside of, but within a threshold time of, a time location for an SSB transmission (e.g., at the first SCS) using the particular beam, as described above.

As indicated above, FIG. 10 is provided as an example. Other examples may differ from what is described with respect to FIG. 10.

Figure 11:
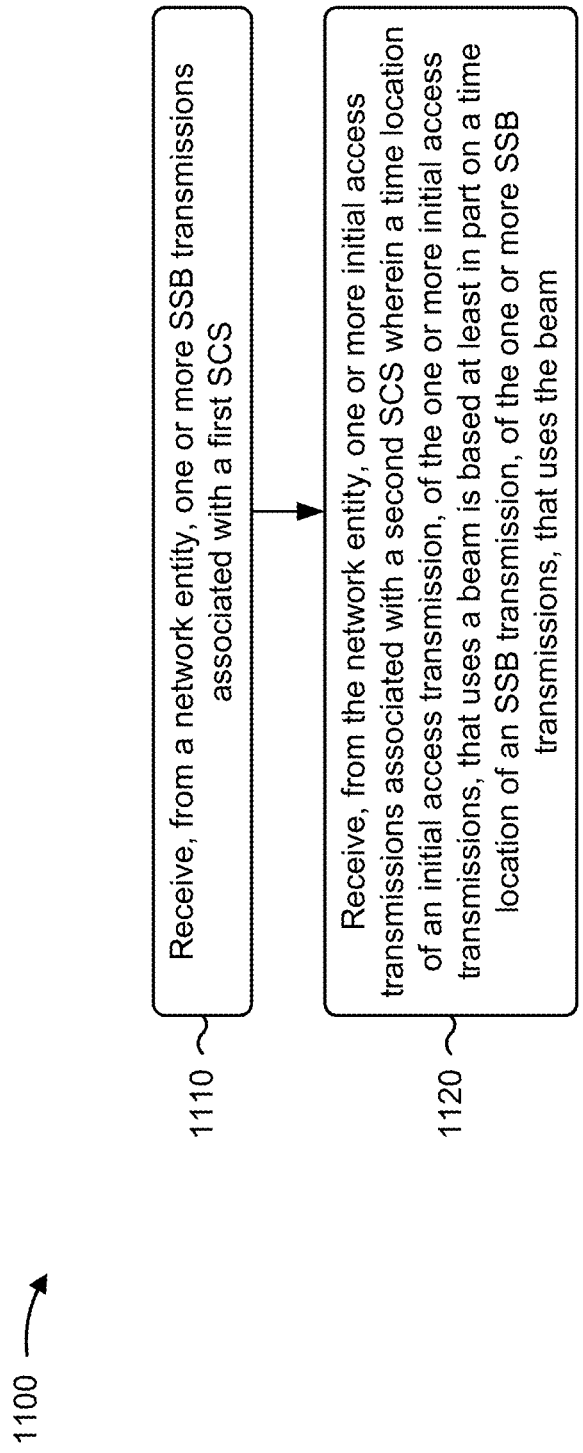
FIGS. 11-12 are diagrams illustrating example processes associated with beam alignment for transmissions using different SCSs, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with beam alignment for transmissions using different SCSs.

As shown in FIG. 11, in some aspects, process 1100 may include receiving, from a network entity, one or more SSB transmissions associated with a first SCS (block 1110). For example, the UE (e.g., using reception component 1302, depicted in FIG. 13) may receive, from a network entity, one or more SSB transmissions associated with a first SCS, as described above.

As further shown in FIG. 11, in some aspects, process 1100 may include receiving, from the network entity, one or more initial access transmissions associated with a second SCS, wherein a time location of an initial access transmission, of the one or more initial access transmissions, that uses a beam is based at least in part on a time location of an SSB transmission, of the one or more SSB transmissions, that uses the beam (block 1120). For example, the UE (e.g., using reception component 1302, depicted in FIG. 13) may receive, from the network entity, one or more initial access transmissions associated with a second SCS, as described above. In some aspects, a time location of an initial access transmission, of the one or more initial access transmissions, that uses a beam is based at least in part on a time location of an SSB transmission, of the one or more SSB transmissions, that uses the beam.

Process 1100 may include additional aspects, such as any single aspect or any combination of aspects described below and/or in connection with one or more other processes described elsewhere herein.

In a first aspect, the second SCS is larger than the first SCS.

In a second aspect, alone or in combination with the first aspect, the time location of the initial access transmission is within the time location of the SSB transmission.

In a third aspect, alone or in combination with one or more of the first and second aspects, the time location of the initial access transmission is within a threshold time before or after the time location of the SSB transmission.

In a fourth aspect, alone or in combination with one or more of the first through third aspects, a time gap is between a first initial access transmission and a second initial access transmission, of the one or more initial access transmissions, that are consecutive.

In a fifth aspect, alone or in combination with one or more of the first through fourth aspects, the time gap is one or more symbols or one or more slots.

In a sixth aspect, alone or in combination with one or more of the first through fifth aspects, the initial access transmission includes one or more of a different SSB transmission, a transmission in a CORESET, or a SIB transmission.

In a seventh aspect, alone or in combination with one or more of the first through sixth aspects, two or more of the different SSB transmission, the CORESET, and the SIB transmission are at least one of time division multiplexed together or frequency division multiplexed together.

In an eighth aspect, alone or in combination with one or more of the first through seventh aspects, two or more of the different SSB transmission, the CORESET, and the SIB transmission are contiguous in time.

In a ninth aspect, alone or in combination with one or more of the first through eighth aspects, two or more of the different SSB transmission, the CORESET, and the SIB transmission are non-contiguous in time.

In a tenth aspect, alone or in combination with one or more of the first through ninth aspects, at least one of the CORESET or the SIB transmission spans multiple slots.

In an eleventh aspect, alone or in combination with one or more of the first through tenth aspects, at least one of the CORESET or the SIB transmission is confined to a single slot.

In a twelfth aspect, alone or in combination with one or more of the first through eleventh aspects, the different SSB transmission, the CORESET, and the SIB transmission are confined to a single slot.

In a thirteenth aspect, alone or in combination with one or more of the first through twelfth aspects, a starting time of a first initial access transmission, of the one or more initial access transmissions, that uses a first beam, relative to a time location of a first SSB transmission, of the one or more SSB transmissions, that uses the first beam, is different from a starting time of a second initial access transmission, of the one or more initial access transmissions, that uses a second beam, relative to a time location of a second SSB transmission, of the one or more SSB transmissions, that uses the second beam.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
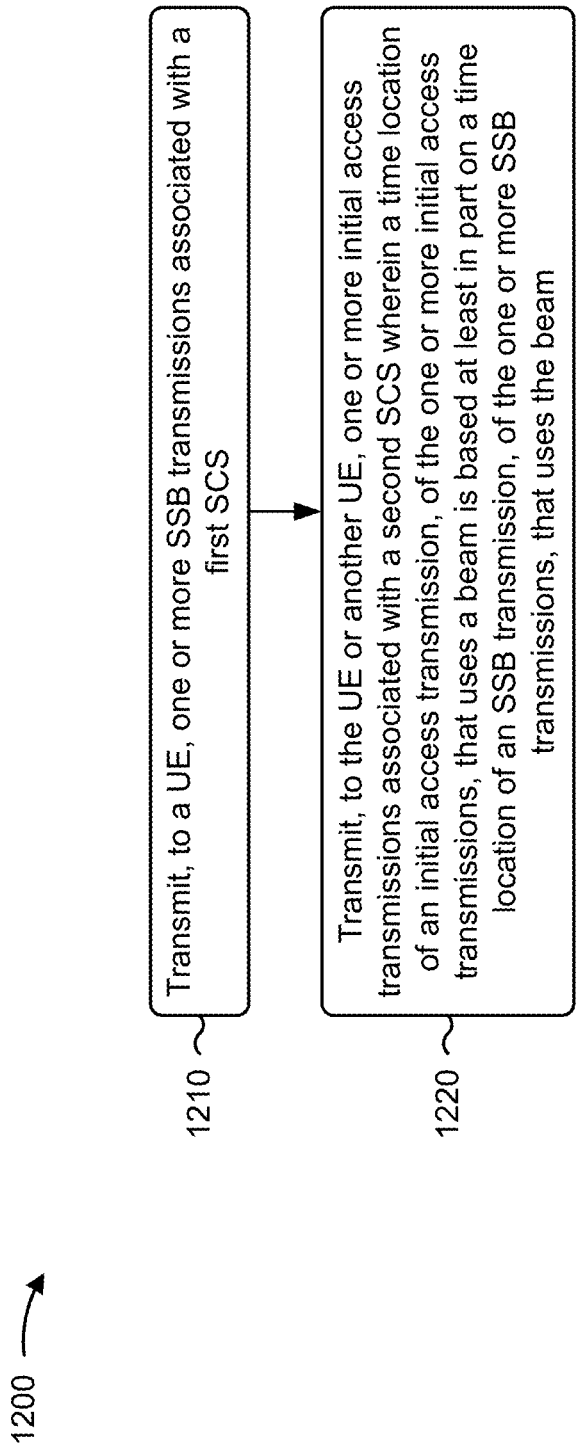

FIG. 12 is a diagram illustrating an example process 1200 performed, for example, by a network entity, in accordance with the present disclosure. Example process 1200 is an example where the network entity (e.g., base station 110) performs operations associated with beam alignment for transmissions using different SCSs.

As shown in FIG. 12, in some aspects, process 1200 may include transmitting, to a UE, one or more SSB transmissions associated with a first SCS (block 1210). For example, the network entity (e.g., using transmission component 1404, depicted in FIG. 14) may transmit, to a UE, one or more SSB transmissions associated with a first SCS, as described above.

As further shown in FIG. 12, in some aspects, process 1200 may include transmitting, to the UE or another UE, one or more initial access transmissions associated with a second SCS, wherein a time location of an initial access transmission, of the one or more initial access transmissions, that uses a beam is based at least in part on a time location of an SSB transmission, of the one or more SSB transmissions, that uses the beam (block 1220). For example, the network entity (e.g., using transmission component 1404, depicted in FIG. 14) may transmit, to the UE or another UE, one or more initial access transmissions associated with a second SCS, as described above. In some aspects, a time location of an initial access transmission, of the one or more initial access transmissions, that uses a beam is based at least in part on a time location of an SSB transmission, of the one or more SSB transmissions, that uses the beam.

Process 1200 may include additional aspects, such as any single aspect or any combination of aspects described below and/or in connection with one or more other processes described elsewhere herein.

In a first aspect, the second SCS is larger than the first SCS.

In a second aspect, alone or in combination with the first aspect, the time location of the initial access transmission is within the time location of the SSB transmission.

In a third aspect, alone or in combination with one or more of the first and second aspects, the time location of the initial access transmission is within a threshold time before or after the time location of the SSB transmission.

In a fourth aspect, alone or in combination with one or more of the first through third aspects, a time gap is between a first initial access transmission and a second initial access transmission, of the one or more initial access transmissions, that are consecutive.

In a fifth aspect, alone or in combination with one or more of the first through fourth aspects, the time gap is one or more symbols or one or more slots.

In a sixth aspect, alone or in combination with one or more of the first through fifth aspects, the initial access transmission includes one or more of a different SSB transmission, a transmission in a CORESET, or a SIB transmission.

In a seventh aspect, alone or in combination with one or more of the first through sixth aspects, two or more of the different SSB transmission, the CORESET, and the SIB transmission are at least one of time division multiplexed together or frequency division multiplexed together.

In an eighth aspect, alone or in combination with one or more of the first through seventh aspects, two or more of the different SSB transmission, the CORESET, and the SIB transmission are contiguous in time.

In a ninth aspect, alone or in combination with one or more of the first through eighth aspects, two or more of the different SSB transmission, the CORESET, and the SIB transmission are non-contiguous in time.

In a tenth aspect, alone or in combination with one or more of the first through ninth aspects, at least one of the CORESET or the SIB transmission spans multiple slots.

In an eleventh aspect, alone or in combination with one or more of the first through tenth aspects, at least one of the CORESET or the SIB transmission is confined to a single slot.

In a twelfth aspect, alone or in combination with one or more of the first through eleventh aspects, the different SSB transmission, the CORESET, and the SIB transmission are confined to a single slot.

In a thirteenth aspect, alone or in combination with one or more of the first through twelfth aspects, a starting time of a first initial access transmission, of the one or more initial access transmissions, that uses a first beam, relative to a time location of a first SSB transmission, of the one or more SSB transmissions, that uses the first beam, is different from a starting time of a second initial access transmission, of the one or more initial access transmissions, that uses a second beam, relative to a time location of a second SSB transmission, of the one or more SSB transmissions, that uses the second beam.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
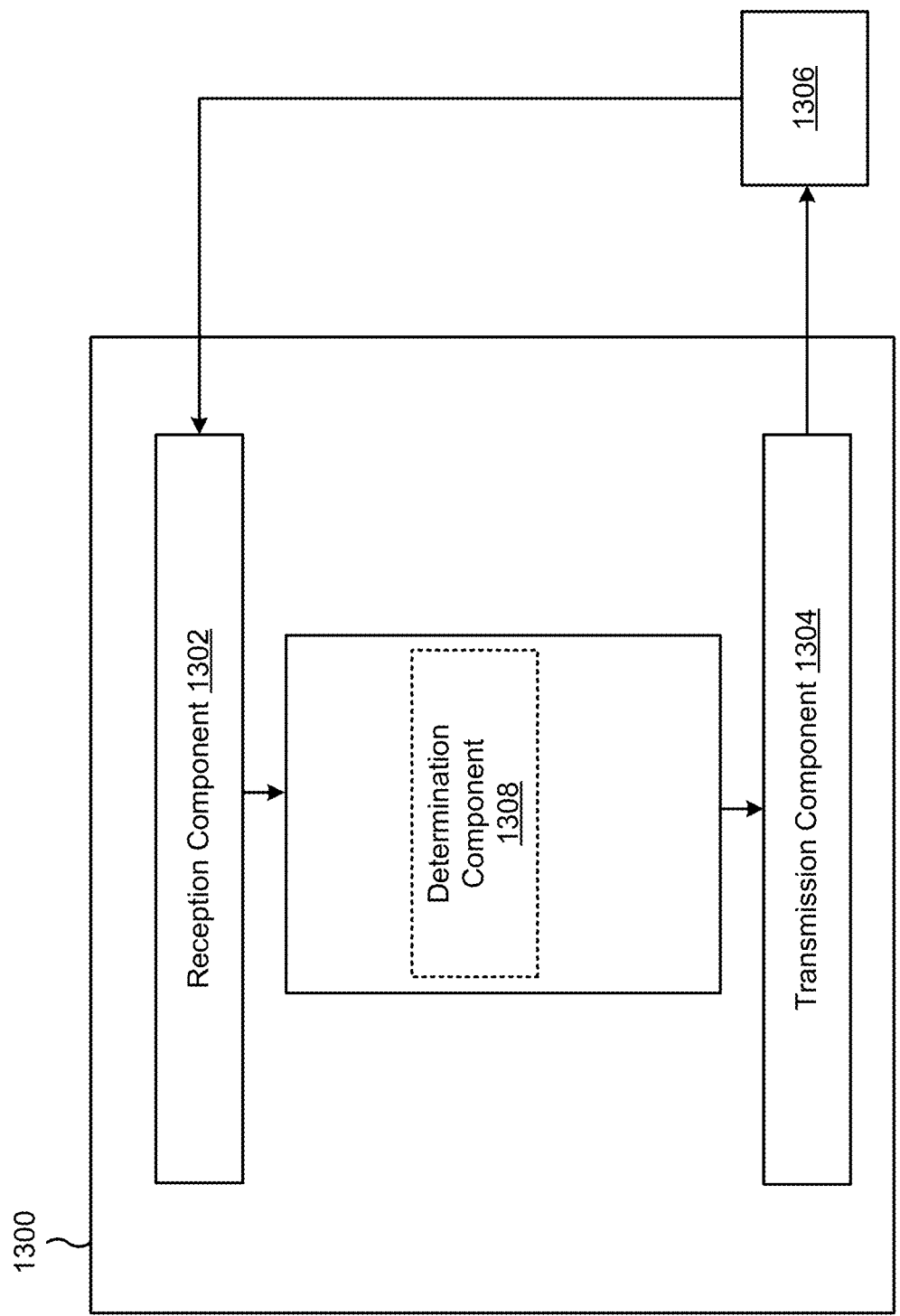
FIGS. 13-14 are diagrams of example apparatuses for wireless communication, in accordance with the present disclosure.

FIG. 13 is a diagram of an example apparatus 1300 for wireless communication, in accordance with the present disclosure. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a determination component 1308, among other examples.

In some aspects, the apparatus 1300 may be configured to perform one or more operations described herein in connection with FIGS. 8-10. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The reception component 1302 may receive, from a network entity, one or more SSB transmissions associated with a first SCS. The reception component 1302 may receive, from the network entity, one or more initial access transmissions associated with a second SCS. In some aspects, a time location of an initial access transmission, of the one or more initial access transmissions, that uses a beam is based at least in part on a time location of an SSB transmission, of the one or more SSB transmissions, that uses the beam.

The determination component 1308 may determine a beam and a time location for receiving an SSB transmission and/or for receiving an initial access transmission (e.g., according to a beam pattern). In some aspects, the determination component 1308 may include a controller/processor, a memory, or a combination thereof, of the UE described above in connection with FIG. 2

The quantity and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
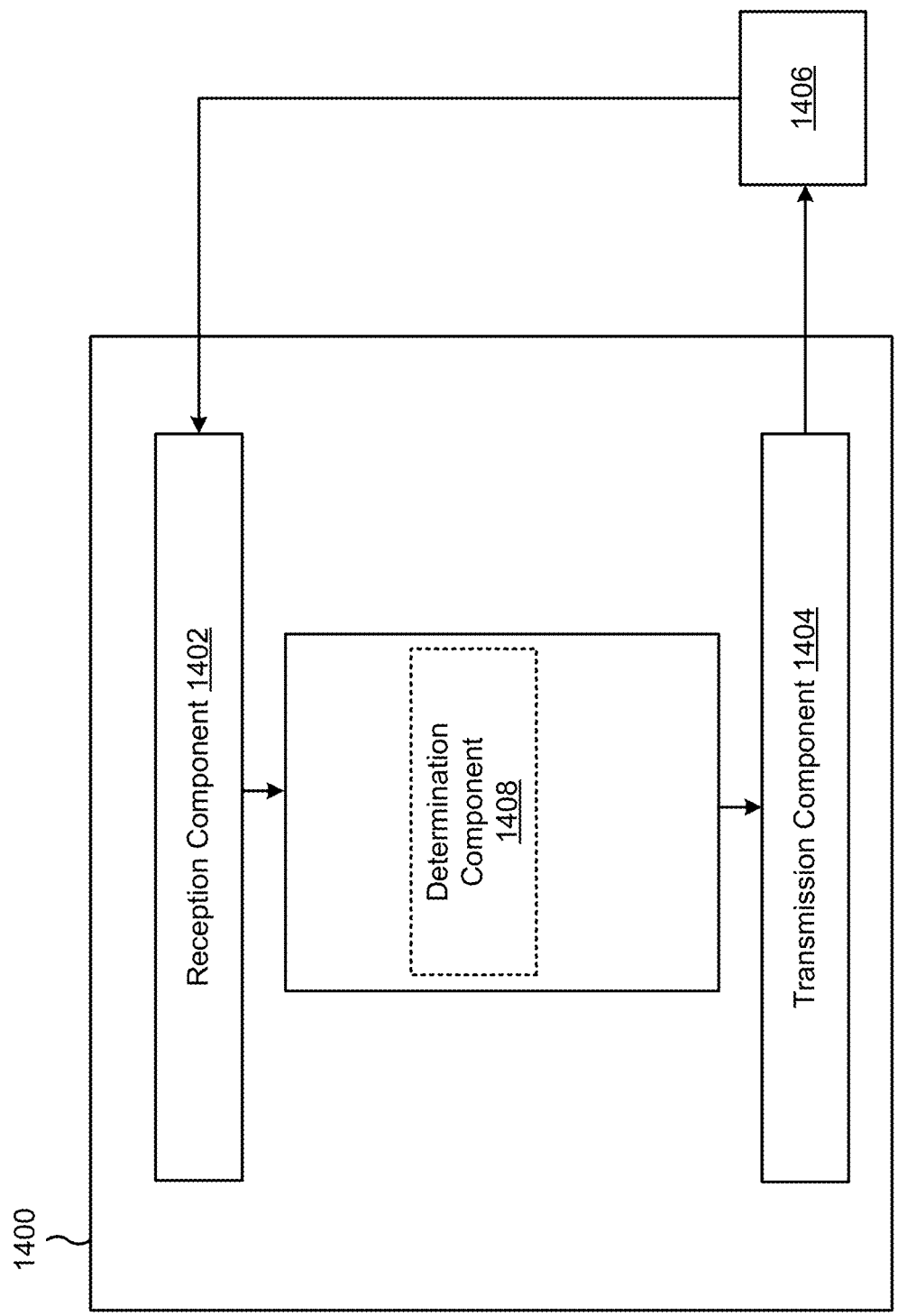

FIG. 14 is a diagram of an example apparatus 1400 for wireless communication, in accordance with the present disclosure. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a determination component 1408, among other examples.

In some aspects, the apparatus 1400 may be configured to perform one or more operations described herein in connection with FIGS. 8-10. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be co-located with the reception component 1402 in a transceiver.

The transmission component 1404 may transmit, to a UE, one or more SSB transmissions associated with a first SCS. The transmission component 1404 may transmit, to the UE or another UE, one or more initial access transmissions associated with a second SCS. In some aspects, a time location of an initial access transmission, of the one or more initial access transmissions, that uses a beam is based at least in part on a time location of an SSB transmission, of the one or more SSB transmissions, that uses the beam.

The determination component 1408 may determine a beam and a time location for transmitting an SSB transmission and/or for transmitting an initial access transmission (e.g., according to a beam pattern). In some aspects, the determination component 1408 may include a controller/processor, a memory, or a combination thereof, of the base station described above in connection with FIG. 2

The quantity and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving, from a network entity, one or more synchronization signal block (SSB) transmissions associated with a first subcarrier spacing (SCS); and receiving, from the network entity, one or more initial access transmissions associated with a second SCS, wherein a time location of an initial access transmission, of the one or more initial access transmissions, that uses a beam is based at least in part on a time location of an SSB transmission, of the one or more SSB transmissions, that uses the beam.

Aspect 2: The method of Aspect 1, wherein the second SCS is larger than the first SCS.

Aspect 3: The method of any of Aspects 1-2, wherein the time location of the initial access transmission is within the time location of the SSB transmission.

Aspect 4: The method of any of Aspects 1-2, wherein the time location of the initial access transmission is within a threshold time before or after the time location of the SSB transmission.

Aspect 5: The method of any of Aspects 1-4, wherein a time gap is between a first initial access transmission and a second initial access transmission, of the one or more initial access transmissions, that are consecutive.

Aspect 6: The method of Aspect 5, wherein the time gap is one or more symbols or one or more slots.

Aspect 7: The method of any of Aspects 1-6, wherein the initial access transmission includes one or more of a different SSB transmission, a transmission in a control resource set (CORESET), or a system information block (SIB) transmission.

Aspect 8: The method of Aspect 7, wherein two or more of the different SSB transmission, the CORESET, and the SIB transmission are at least one of time division multiplexed together or frequency division multiplexed together.

Aspect 9: The method of any of Aspects 7-8, wherein two or more of the different SSB transmission, the CORESET, and the SIB transmission are contiguous in time.

Aspect 10: The method of any of Aspects 7-8, wherein two or more of the different SSB transmission, the CORESET, and the SIB transmission are non-contiguous in time.

Aspect 11: The method of any of Aspects 7-10, wherein at least one of the CORESET or the SIB transmission spans multiple slots.

Aspect 12: The method of any of Aspects 7-10, wherein at least one of the CORESET or the SIB transmission is confined to a single slot.

Aspect 13: The method of any of Aspects 7-10, wherein the different SSB transmission, the CORESET, and the SIB transmission are confined to a single slot.

Aspect 14: The method of any of Aspects 1-13, wherein a starting time of a first initial access transmission, of the one or more initial access transmissions, that uses a first beam, relative to a time location of a first SSB transmission, of the one or more SSB transmissions, that uses the first beam, is different from a starting time of a second initial access transmission, of the one or more initial access transmissions, that uses a second beam, relative to a time location of a second SSB transmission, of the one or more SSB transmissions, that uses the second beam.

Aspect 15: A method of wireless communication performed by a network entity, comprising: transmitting, to a user equipment (UE), one or more synchronization signal block (SSB) transmissions associated with a first subcarrier spacing (SCS); and transmitting, to the UE or another UE, one or more initial access transmissions associated with a second SCS, wherein a time location of an initial access transmission, of the one or more initial access transmissions, that uses a beam is based at least in part on a time location of an SSB transmission, of the one or more SSB transmissions, that uses the beam.

Aspect 16: The method of Aspect 15, wherein the second SCS is larger than the first SCS.

Aspect 17: The method of any of Aspects 15-16, wherein the time location of the initial access transmission is within the time location of the SSB transmission.

Aspect 18: The method of any of Aspects 15-16, wherein the time location of the initial access transmission is within a threshold time before or after the time location of the SSB transmission.

Aspect 19: The method of any of Aspects 15-18, wherein a time gap is between a first initial access transmission and a second initial access transmission, of the one or more initial access transmissions, that are consecutive.

Aspect 20: The method of Aspect 19, wherein the time gap is one or more symbols or one or more slots.

Aspect 21: The method of any of Aspects 15-20, wherein the initial access transmission includes one or more of a different SSB transmission, a transmission in a control resource set (CORESET), or a system information block (SIB) transmission.

Aspect 22: The method of Aspect 21, wherein two or more of the different SSB transmission, the CORESET, and the SIB transmission are at least one of time division multiplexed together or frequency division multiplexed together.

Aspect 23: The method of any of Aspects 21-22, wherein two or more of the different SSB transmission, the CORESET, and the SIB transmission are contiguous in time.

Aspect 24: The method of any of Aspects 21-22, wherein two or more of the different SSB transmission, the CORESET, and the SIB transmission are non-contiguous in time.

Aspect 25: The method of any of Aspects 21-24, wherein at least one of the CORESET or the SIB transmission spans multiple slots.

Aspect 26: The method of any of Aspects 21-24, wherein at least one of the CORESET or the SIB transmission is confined to a single slot.

Aspect 27: The method of any of Aspects 21-24, wherein the different SSB transmission, the CORESET, and the SIB transmission are confined to a single slot.

Aspect 28: The method of any of Aspects 15-27, wherein a starting time of a first initial access transmission, of the one or more initial access transmissions, that uses a first beam, relative to a time location of a first SSB transmission, of the one or more SSB transmissions, that uses the first beam, is different from a starting time of a second initial access transmission, of the one or more initial access transmissions, that uses a second beam, relative to a time location of a second SSB transmission, of the one or more SSB transmissions, that uses the second beam.

Aspect 29: An apparatus for wireless communication at a device, comprising a processor; memory coupled with the processor; and instructions stored in the memory and executable by the processor to cause the apparatus to perform the method of one or more Aspects of Aspects 1-14.

Aspect 30: A device for wireless communication, comprising a memory and one or more processors coupled to the memory, the memory and the one or more processors configured to perform the method of one or more Aspects of Aspects 1-14.

Aspect 31: An apparatus for wireless communication, comprising at least one means for performing the method of one or more Aspects of Aspects 1-14.

Aspect 32: A non-transitory computer-readable medium storing code for wireless communication, the code comprising instructions executable by a processor to perform the method of one or more Aspects of Aspects 1-14.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 1-14.

Aspect 34: An apparatus for wireless communication at a device, comprising a processor; memory coupled with the processor; and instructions stored in the memory and executable by the processor to cause the apparatus to perform the method of one or more Aspects of Aspects 15-28.

Aspect 35: A device for wireless communication, comprising a memory and one or more processors coupled to the memory, the memory and the one or more processors configured to perform the method of one or more Aspects of Aspects 15-28.

Aspect 36: An apparatus for wireless communication, comprising at least one means for performing the method of one or more Aspects of Aspects 15-28.

Aspect 37: A non-transitory computer-readable medium storing code for wireless communication, the code comprising instructions executable by a processor to perform the method of one or more Aspects of Aspects 15-28.

Aspect 38: A non-transitory computer-readable medium storing a set of instructions for wireless communication, the set of instructions comprising one or more instructions that, when executed by one or more processors of a device, cause the device to perform the method of one or more Aspects of Aspects 15-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors coupled to the one or more memories, the one or more processors individually or collectively configured to:
      receive, from a network entity and on a primary cell that uses a first subcarrier spacing (SCS), one or more synchronization signal block (SSB) transmissions associated with the first SCS; and
      receive, from the network entity and on a secondary cell that uses a second SCS, a plurality of initial access transmissions associated with the second SCS,
         wherein a time location of a first initial access transmission, of the plurality of initial access transmissions, that uses a beam is within, or a threshold time before or after, a time location of an SSB transmission, of the one or more SSB transmissions, that uses the beam,
         wherein a time gap exists between the first initial access transmission and a second initial access transmission of the plurality of initial access transmissions, wherein the first initial access transmission and the second initial access transmission use consecutive beams according to a beam pattern, and
         wherein a starting time of the first initial access transmission that uses a first beam, of the consecutive beams and relative to a time location of a first SSB transmission of the one or more SSB transmissions, is different from a starting time of the second initial access transmission that uses a second beam, of the consecutive beams, relative to a time location of a second SSB transmission of the one or more SSB transmissions.

2. The UE of claim 1, wherein the second SCS is larger than the first SCS.

3. The UE of claim 1, wherein the time location of the first initial access transmission is exactly within the time location of the SSB transmission.

4. The UE of claim 1, wherein the time location of the first initial access transmission is within the threshold time after the time location of the SSB transmission.

5. The UE of claim 1, wherein the first initial access transmission and the second initial access transmission are consecutive.

6. The UE of claim 1, wherein the first initial access transmission includes one or more of a different SSB transmission, a transmission in a control resource set (CORESET), or a system information block (SIB) transmission.

7. The UE of claim 6, wherein two or more of the different SSB transmission, the CORESET, and the SIB transmission are at least one of time division multiplexed together or frequency division multiplexed together.

8. The UE of claim 6, wherein two or more of the different SSB transmission, the CORESET, and the SIB transmission are contiguous in time.

9. The UE of claim 6, wherein two or more of the different SSB transmission, the CORESET, and the SIB transmission are non-contiguous in time.

10. The UE of claim 6, wherein at least one of the CORESET or the SIB transmission spans multiple slots.

11. The UE of claim 6, wherein at least one of the different SSB transmission, the CORESET, or the SIB transmission are confined to a single slot.

12. The UE of claim 1, wherein the first SSB transmission uses the first beam and the second SSB transmission uses the second beam.

13. The UE of claim 7, wherein the two or more of the different SSB transmission, the CORESET, and the SIB transmission are time division multiplexed together and frequency division multiplexed together.

14. The UE of claim 10, wherein each of the CORESET and the SIB transmission spans the multiple slots.

15. The UE of claim 1, wherein the first SSB transmission is associated with the first SCS, and wherein the second SSB transmission is associated with the second SCS.

16. A network entity for wireless communication, comprising:
   one or more memories; and
   one or more processors coupled to the one or more memories, the one or more processors individually or collectively configured to:
      transmit, to a user equipment (UE) and on a primary cell that uses a first subcarrier spacing (SCS), one or more synchronization signal block (SSB) transmissions associated with the first SCS; and
      transmit, to the UE or another UE and on a secondary cell that uses a second SCS, a plurality of initial access transmissions associated with the second SCS,
         wherein a time location of a first initial access transmission, of the plurality of initial access transmissions, that uses a beam is within, or a threshold time before or after, a time location of an SSB transmission, of the one or more SSB transmissions, that uses the beam,
         wherein a time gap exists between a first initial access transmission and a second initial access transmission of the one or more initial access transmissions, wherein the first initial access transmission and the second initial access transmission use consecutive beams according to a beam pattern, and wherein a starting time of the first initial access transmission that uses a first beam, of the consecutive beams and relative to a time location of a first SSB transmission of the one or more SSB transmissions, is different from a starting time of the second initial access transmission that uses a second beam, of the consecutive beams, relative to a time location of a second SSB transmission of the one or more SSB transmissions.

17. The network entity of claim 16, wherein the second SCS is larger than the first SCS.

18. The network entity of claim 16, wherein the time location of the first initial access transmission is exactly within the time location of the SSB transmission.

19. The network entity of claim 16, wherein the first initial access transmission and the second initial access transmission are consecutive.

20. The network entity of claim 16, wherein the first initial access transmission includes one or more of a different SSB transmission, a transmission in a control resource set (CORESET), or a system information block (SIB) transmission.

21. The network entity of claim 20, wherein two or more of the different SSB transmission, the CORESET, and the SIB transmission are at least one of time division multiplexed together or frequency division multiplexed together.

22. The network entity of claim 20, wherein two or more of the different SSB transmission, the CORESET, and the SIB transmission are contiguous in time.

23. The network entity of claim 20, wherein two or more of the different SSB transmission, the CORESET, and the SIB transmission are non-contiguous in time.

24. The network entity of claim 20, wherein at least one of the CORESET or the SIB transmission spans multiple slots.

25. The network entity of claim 20, wherein at least one of the different SSB transmission, the CORESET, or the SIB transmission are confined to a single slot.

26. The network entity of claim 16, wherein the first SSB transmission uses the first beam and the second SSB transmission uses the second beam.

27. A method of wireless communication performed by a user equipment (UE), comprising:
receiving, from a network entity and on a primary cell that uses a first subcarrier spacing (SCS), one or more synchronization signal block (SSB) transmissions associated with the first subcarrier spacing (SCS); and
receiving, from the network entity and on a secondary cell that uses a second SCS, a plurality of initial access transmissions associated with the second SCS,
wherein a time location of a first initial access transmission, of the plurality of initial access transmissions, that uses a beam is within, or a threshold time before or after, a time location of an SSB transmission, of the one or more SSB transmissions, that uses the beam,
wherein a time gap exists between the first initial access transmission and a second initial access transmission of the plurality of initial access transmissions, wherein the first initial access transmission and the second initial access transmission use consecutive beams according to a beam pattern, and
wherein a starting time of the first initial access transmission that uses a first beam, of the consecutive beams and relative to a time location of a first SSB transmission of the one or more SSB transmissions, is different from a starting time of the second initial access transmission that uses a second beam, of the consecutive beams, relative to a time location of a second SSB transmission of the one or more SSB transmissions.

28. The method of claim 27, wherein the time location of the first initial access transmission is exactly within the time location of the SSB transmission.

29. A method of wireless communication performed by a network entity, comprising:
transmitting, to a user equipment (UE) and on a primary cell that uses a first subcarrier spacing (SCS), one or more synchronization signal block (SSB) transmissions associated with the first subcarrier spacing (SCS); and
transmitting, to the UE or another UE and on a secondary cell that uses a second SCS, a plurality of initial access transmissions associated with the second SCS,
wherein a time location of a first initial access transmission, of the plurality of initial access transmissions, that uses a beam is within, a threshold time before or after, a time location of an SSB transmission, of the one or more SSB transmissions, that uses the beam,
wherein a time gap exists between the first initial access transmission and a second initial access transmission of the plurality of initial access transmissions, wherein the first initial access transmission and the second initial access transmission using consecutive beams according to a beam pattern, and
wherein a starting time of the first initial access transmission that uses a first beam, of the consecutive beams and relative to a time location of a first SSB transmission of the one or more SSB transmissions, is different from a starting time of the second initial access transmission that uses a second beam, of the consecutive beams, relative to a time location of a second SSB transmission of the one or more SSB transmissions.

30. The method of claim 29, wherein the time location of the first initial access transmission is exactly within the time location of the SSB transmission.

* * * * *